United States Patent
Virtanen

(10) Patent No.: US 6,249,681 B1
(45) Date of Patent: *Jun. 19, 2001

(54) METHOD AND APPARATUS FOR PACKET DATA CALL RE-ESTABLISHMENT IN A TELECOMMUNICATIONS SYSTEM

(75) Inventor: Sami Virtanen, Kauniainen (FI)

(73) Assignee: Nokia Mobile Phones Ltd., Espoo (FI)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/834,708

(22) Filed: Apr. 1, 1997

(51) Int. Cl.[7] ............................ H04B 7/00; H04J 3/24; H04Q 7/20
(52) U.S. Cl. .................. 455/466; 455/509; 370/349
(58) Field of Search .................................. 455/403, 405, 455/407, 408; 370/477, 328, 349, 338, 401; 379/190, 191, 192, 193

(56) References Cited

U.S. PATENT DOCUMENTS

| | | | |
|---|---|---|---|
| 4,837,800 | * 6/1989 | Freeburg et al. | 455/557 |
| 5,175,758 | 12/1992 | Levanto et al. | 379/57 |
| 5,394,391 | 2/1995 | Chen et al. | 370/18 |
| 5,410,591 | * 4/1995 | Takahashi | 379/201 |
| 5,471,404 | * 11/1995 | Mazer | 455/67.4 |
| 5,544,224 | 8/1996 | Jonsson et al. | 379/58 |
| 5,546,382 | * 8/1996 | Fujino | 455/405 |
| 5,566,225 | * 10/1996 | Haas | 455/423 |
| 5,675,628 | * 10/1997 | Hokkanen | 455/433 |
| 5,708,820 | * 1/1998 | Park et al. | 395/750.05 |
| 5,745,695 | * 4/1998 | Gilchrist et al. | 395/200.57 |
| 5,764,278 | 6/1998 | Nagao | 348/15 |
| 5,802,465 | * 9/1998 | Hamalainen et al. | 455/403 |
| 5,806,007 | * 9/1998 | Raith et al. | 455/574 |

FOREIGN PATENT DOCUMENTS

| | | |
|---|---|---|
| 0 642 283 A2 | 3/1995 | (EP) . |
| 07312647 | 11/1995 | (EP) . |

\* cited by examiner

*Primary Examiner*—Nguyen T. Vo
*Assistant Examiner*—Charles N. Appiah
(74) *Attorney, Agent, or Firm*—Brian T. Rivers

(57) ABSTRACT

A method and apparatus for re-establishing an interrupted data packet call on a channel between two transceiving devices in a telecommunications system. In an embodiment of the invention, when packet data has not been sent or received in the call for a predetermined time period, the call is released and call configuration information is saved in at least one of the transceiving devices. If it is then necessary to transmit further packet data for the call, either one of the transceiving devices may initiate, within a predetermined time period, the sending of a call re-establishment message to re-establish the call. The call re-establishment message includes only necessary information to re-establish the call. Information that is saved upon call release is not sent in the re-establishment message. Information in the re-establishment message is used to retrieve the call configuration information that was saved upon call release. The call is then re-established using the information in the re-establishment message and the retrieved information.

15 Claims, 7 Drawing Sheets

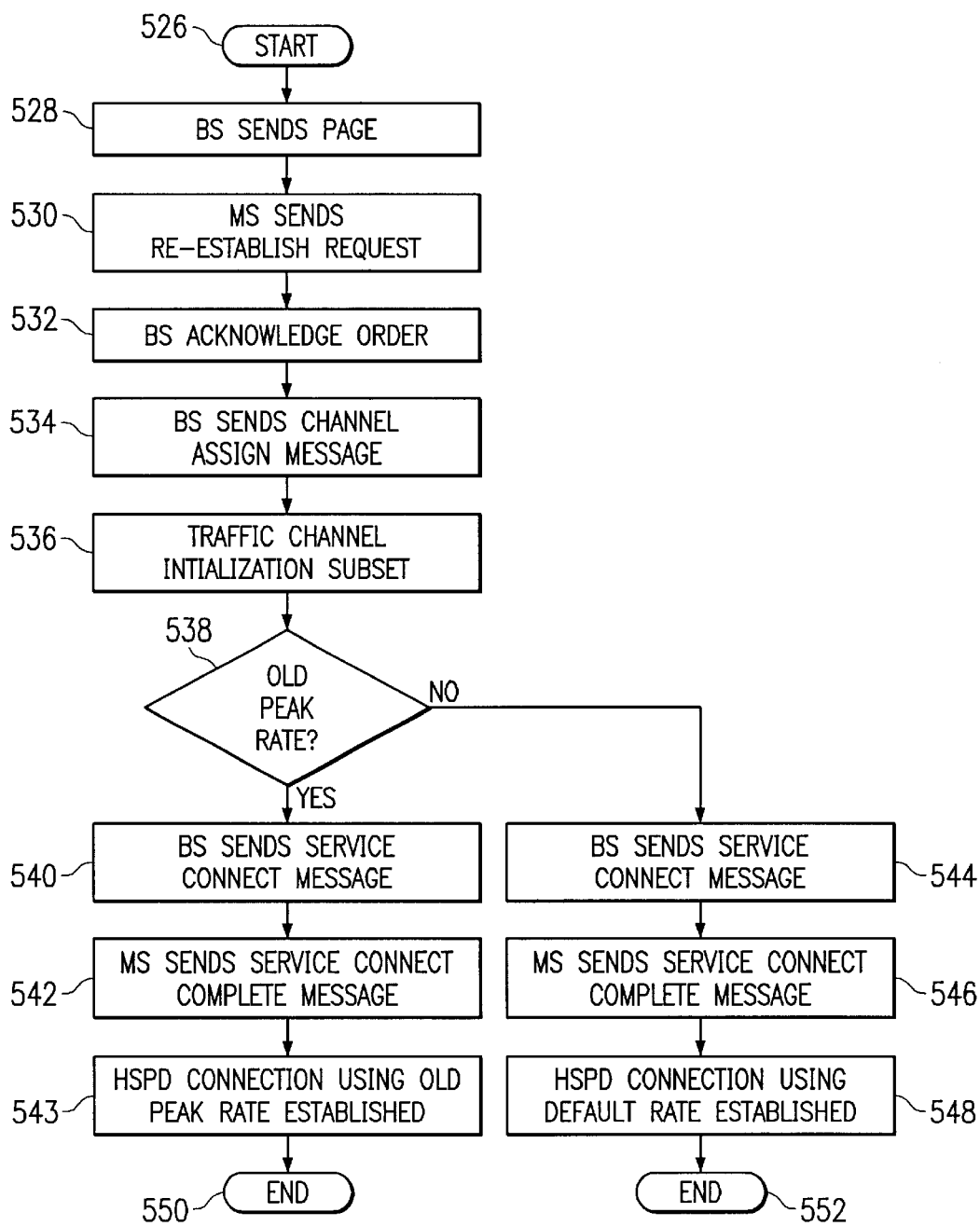

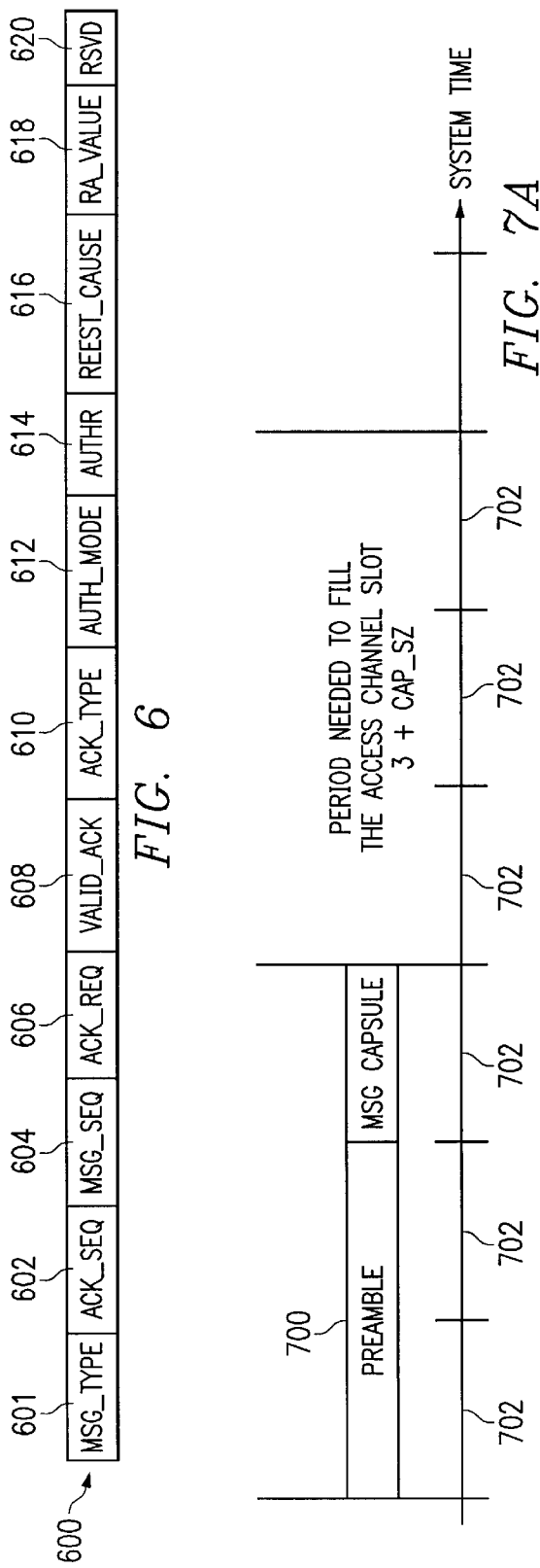
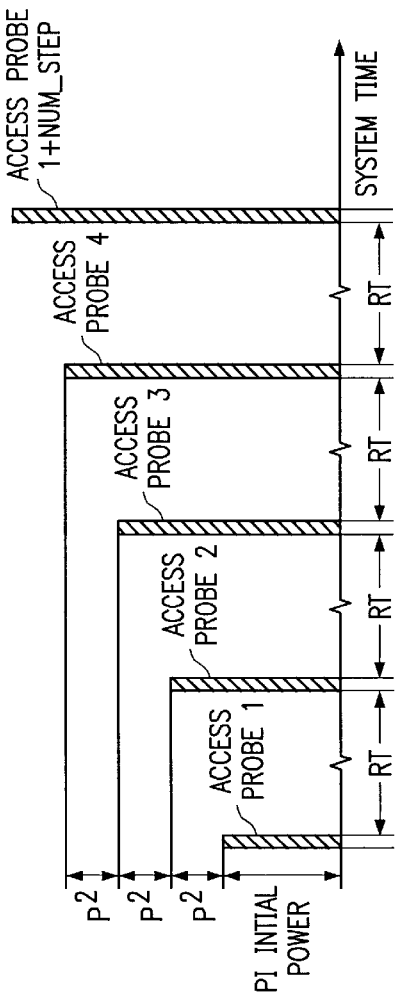
FIG. 6
FIG. 7A
FIG. 7B

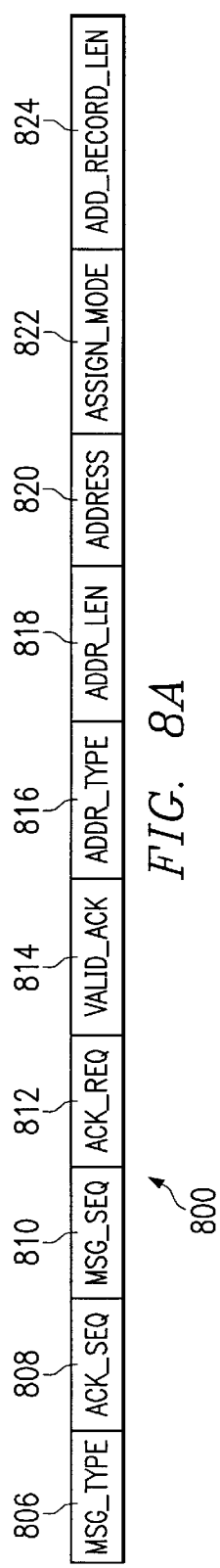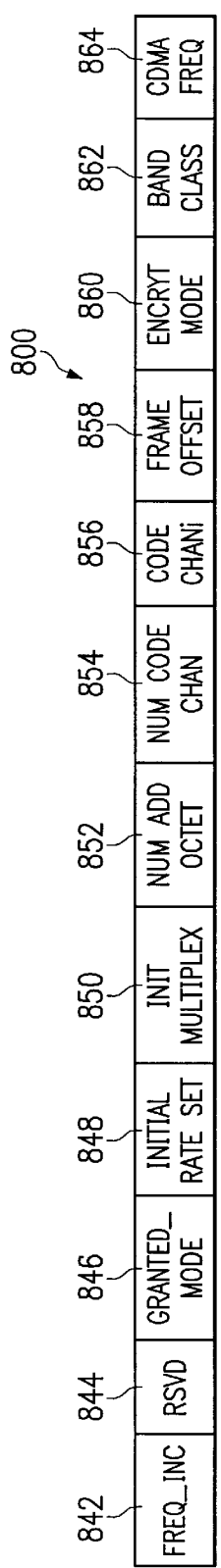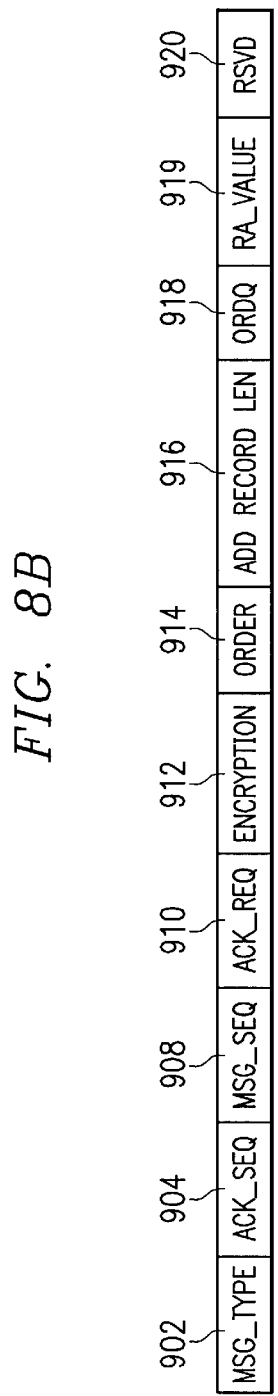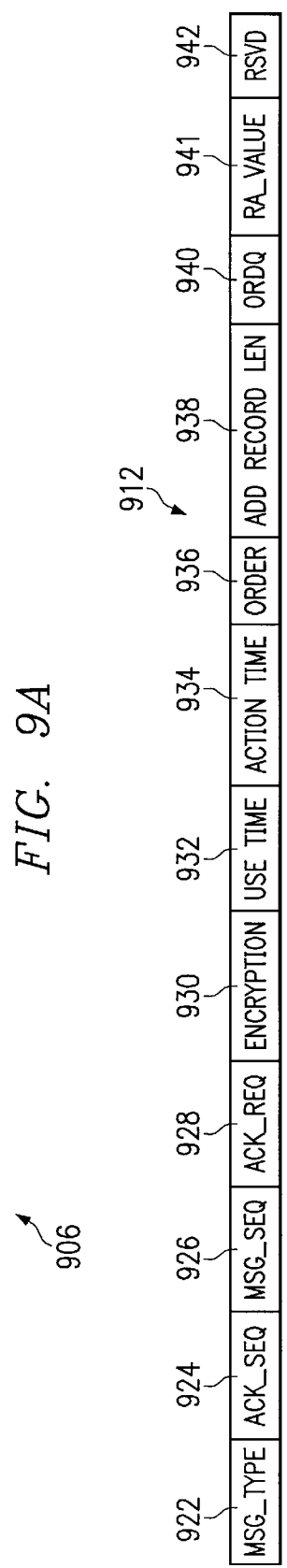
FIG. 8A
FIG. 8B
FIG. 9A
FIG. 9B

METHOD AND APPARATUS FOR PACKET DATA CALL RE-ESTABLISHMENT IN A TELECOMMUNICATIONS SYSTEM

FIELD OF THE INVENTION

This invention relates to call re-establishment in telecommunications systems and, more particularly, to a method and apparatus for re-establishing an interrupted packet data call in a telecommunications system.

BACKGROUND OF THE INVENTION

In a typical cellular system, call establishment begins either by a base station transmitting a paging message to a mobile station on a paging channel and, then the mobile station transmitting a paging response message to the base station on an access channel, or, by a mobile station accessing the system on an access channel by transmitting an origination message to a base station. In either of these call establishment cases, the mobile station must obtain access to the system on an access channel, and setup information unique to the particular call establishment must be exchanged between the mobile station and base station over the access channel or other channels of the system air interface. In certain systems, the paging response message and origination message may carry a large portion of this setup information. The setup information unique to the particular call establishment could include called number data, mobile station identification and capability related data, authentication information, etc. After receiving this information, the system must then use the information to setup the different layers of communication necessary in the system to implement the call.

If a connection in an ongoing call in a cellular system is broken while the call is in progress, the call must be re-established in order for the call to be completed. For example, an interruption in communications on the air interface may result in a voice channel being interrupted long enough for a call to be dropped. The call must then be re-established.

Major cellular system types include those operating according to the Global Services for Mobile(GSM)Standard, the TIA/EIA/IS-95 Mobile Station-Base Station compatibility Standard for Dual Mode Wide Band Spread Spectrum Cellular System, the TIA/EIA/IS-136 Mobile Station-Base Station Compatibility Standard, and the TIA/EIA 553 Analog Standard (AMPS/TACS). Other major cellular systems include those operating according to the IS-95 based ANSI-J-STD-008 1.8–2.0 Ghz standard or, those operating according to the GSM based PCS1900 (1900 Mhz frequency range) standard. Systems operating according to the IS-95, IS-136 and AMPS/TACS systems standards do not provide a mechanism for re-establishing a call other than for one of the parties involved in the call to manually reinitiate the call. When this happens the mobile station and base station must re-execute the call establishment procedure, using identical messaging containing the same information as was exchanged when the call was first established.

Systems based on the GSM standard may support a mobile station triggered call re-establishment procedure that uses a call re-establishment message that includes only the subscriber identity of the mobile station and the mobile station's classmark. The procedure involves sending an access request message from the mobile to the system that indicates a re-establishment is requested, accepting a channel assignment from the system and, transmitting the re-establishment request message on the assigned channel. After receiving the call re-establishment message, a GSM system must reconstruct the connection using only the subscriber identity and classmark from information saved in the network.

GSM call re-establishment depends upon the mobile station triggering the re-establishment procedure. The system has a role in triggering re-establishment only so far as it indicates to the mobile station during call setup that it supports the call re-establishment procedure. If the system supports call re-establishment, the GSM specification makes it mandatory for the mobile station to initiate call re-establishment when a connection is lost during a call.

While mobile station triggered call re-establishment procedures similar to the GSM call re-establishment procedure could have application for re-establishment of conventional calls in other digital cellular systems presently in use, additions to the specifications for these other systems, that expand the types of services available, create a need for a more flexible call re-establishment procedure.

Currently, for example, the major cellular systems standards bodies are implementing packet data services into their digital cellular specifications. A packet data service specification has been finalized for GSM, and packet data service specifications compatible with the IS-95 and IS-136 standards are being prepared. The TIA/EIA IS-657 packet data services specification and TIA/EIA TSB-74 Telecommunications Systems Bulletin define a connection based packet data service for IS-95 based networks. In connection based packet data service, a physical circuit connection for the call is maintained by the cellular system during the duration of the packet data call. The IS-657/TSB-74 system allows transmission of packet data at rates up to 14.4 kbps. It has also been proposed to implement high speed packet data (HSPD), at rates of up to 78.8 kbps, into a standard based on IS-657 and TSB-74.

In an application such as IS-657/TSB-74 connection based packet switching service, the GSM-type call re-establishment procedure would not provide the most efficient method of re-establishing a lost connection. IS-657/TSB-74 connection based packet data uses a timer feature in each of the base station/mobile switching center(MSC) and mobile station. A packet inactivity timer in each of the base station/mobile switching center and mobile station are reset whenever packet data frame is sent or received. If the packet inactivity timer expires before more data is sent or received, in either the mobile station or base station/MSC, the mobile station or base station/MSC in which the packet inactivity timer expired disconnects the packet switching service option by sending a release order message. The release order message causes the connection to be released by both the mobile station and base station/MSC. If either the mobile station or base station/MSC has remaining packet data for the call to send after the connection is released, the mobile station or base station/MSC needing to send the packet data must re-establish the call using the identical procedure used to initially establish the call. The GSM call re-establishment procedure would not be useful in an IS-657/TSB74 re-establishment situation because a packet data call may involve a unidirectional exchange of packet data, and initiation of re-establishment of a packet data call may be required from either the mobile station or base Station/MSC. Re-establishment in IS-657/TSB-74 includes using an origination message identical to that initially used to establish the call, and system access procedures, as used for the initial call origination process, are employed. The system access procedure involves transmitting a succession of successively higher powered access probes, that include the origination message, until an acknowledgment is received from the system or a time limit is reached and the access attempt is aborted. In an IS-95 based packet data system the access attempt could take up to 3120 ms, depending upon the number of access probes that must be transmitted before acknowledgment is received from the system by the mobile station. In packet data applications, especially ones involving high speed data, call re-establishment times having this duration may have a negative effect on system performance.

It would provide an advantage, then, to have a method and apparatus for packet data call re-establishment that allows faster re-establishment of a dropped call than can be accomplished by repeating the initial establishment protocol used to first establish the call. Additionally, since packet data may be transmitted from either end of a link independently of the other, it would provide an advantage if the method and apparatus for re-establishing the call allowed either one of a pair of devices in a packet call to initiate call re-establishment.

OBJECTS OF THE INVENTION

It is thus an object of this invention to provide a improved method and apparatus for re-establishing an interrupted data packet call in a cellular telecommunications system.

It is another object of this invention to provide a method and apparatus for shortening the time and decreasing signalling required to re-establish an interrupted data packet call in a telecommunications system.

It is a further object of this invention to provide a method and apparatus for allowing an interrupted packet data call to be re-established from either one of a pair of transceiving devices communicating in the packet data call.

SUMMARY OF THE INVENTION

The foregoing and other problems are overcome and the objects of the invention are realized by methods and apparatus in accordance with embodiments of this invention.

The present invention provides an improved method and apparatus for re-establishing an interrupted data packet call in a telecommunications system. The method and apparatus allows a data packet call to be re-established in a rapid manner while using less signaling resources required to establish a call from an initial state. When communications on an interface between a pair of transceiving devices involved in the packet data call are interrupted or delayed, either one of the pair of transceiving devices may release the call while indicating to the other that the call may be re-established. If an indication that call re-establishment is allowed is sent, information to allow call re-establishment is then saved in the transceiving devices or in the system. For example, if one of the transceiving devices is part of a network infrastructure, information on the setup of the communication layers of the call may be saved in the system infrastructure. The method and apparatus allows either one of the pair of transceiving devices communicating in the call to then initiate call re-establishment.

Call re-establishment is accomplished by using a call re-establishment message that includes, preferably, only the necessary information to re-establish the call. It is not necessary to retransmit information in the re-establish message that has been saved by the transceiving devices and which is unique to the call. This allows quicker system access and re-establishment than could be accomplished if the information that is saved would have to be re-transmitted. This also has an advantage that when only one transceiving device has remaining packet data to transmit after a call is interrupted, that transceiving device can initiate call re-establishment.

In an embodiment of the invention, the method and apparatus is implemented in cellular telecommunications system having a high speed connection based packet data service. In the system, a mobile station involved in a packet data call transmits and receives packet data over an air interface to and from a base station of the system over a traffic channel at data rates that are negotiated at call establishment. The base station is connected to a mobile switching center (MSC), and in turn, transmits and receives the packet data to and from the MSC. The MSC may be connected to any other type of communications network that includes another transmitting or receiving device involved in the packet data call. The other communications network may include another cellular system or a landline telephone network. In the connection based packet data system, a physical circuit connection for the call is maintained by the cellular system during the duration of the packet data call.

The mobile station and base station/MSC are each equipped with a timer that is reset and started when a latest packet data is sent or received. Each timer is set to run a predetermined period and, if no packet data is sent or received to reset the timer before the predetermined period expires, the transceiving device (mobile station or base station) in which the timer expires sends a release order message to the other device. The release order message includes a field indicating that the transceiving device in which the timer expired has saved information necessary for call re-establishment, and that call re-establishment is possible using the call re-establishment process of the invention. The release order message also includes a random value that is generated in the device sending the release order message. The transceiving device that receives the release order message from the transceiving device(mobile station or base station) in which the timer expired then also saves information necessary for call re-establishment and, returns a release order message in reply. The saving of this information, other than the random value, is optional in the mobile station. If performed, the saved information can be compared to the re-established call parameters as an integrity check.

After the call is released, if either the mobile station or base station/MSC has packet data to transmit that belongs to the released call, either may initiate re-establishment of the call. The mobile station initiates the re-establishment process by sending a re-establish request message to the base station. The base station initiates re-establishment by sending a paging message to the mobile station that triggers the sending of a re-establish request message from the mobile station to the base station. The re-establishment request message includes a reduced set of information as compared to the set of information in the call establishment message that was used to initially establish the call. The set of information in the re-establishment request message includes only the minimum information necessary to re-stablish the call. This information includes the random value included in the release message that is generated in the mobile station or base station in which the timer has expired. The random value is used to identify the prior configuration (mobile station identity (MSID), called number, etc.) to the system when the re-establishment request message is received. The information in the call re-establishment request message may also include authentication data that can be used to authenticate the mobile station without executing a complete authentication process.

After receiving the re-establishment request message, the base station/MSC uses the information included in the re-establish request message to determine the identity of the mobile station and to retrieve the saved information that is necessary for call re-establishment, and re-establishes the physical connection between the mobile station and base station. The base station/MSC then transmits a channel assignment message to the mobile station for assigning resources necessary for the link. These resources include the necessary code channel frequency, pilot PN number etc. The data rate configuration is either at the peak rate used previously in the call, or at a default rate that may be assigned in the call re-establishment process, when the system is not able to provide the capacity necessary to use the previous peak rate.

BRIEF DESCRIPTION OF THE DRAWINGS

The above set forth and other features of the invention are made more apparent in the ensuing Detailed Description of the Invention when read in conjunction with the attached Drawings, wherein:

FIGS. 5A and 5B are flow diagrams illustrating process steps performed during call re-establishment initiated by the mobile station and base station, respectively, in a cellular system according to an embodiment of the invention;

FIG. 6 is a diagram illustrating a call re-establishment message, according to an embodiment of the invention;

FIGS. 7A and 7B are diagrams illustrating the re-establish request access channel structure and an access probe sequence, respectively, according to an embodiment of the invention;

FIGS. 8A and 8B are diagrams illustrating a channel assignment message according to an embodiment of the invention; and FIGS. 9A and 9B are diagrams illustrating a release order sent from a base station and a mobile station, respectively, according to an embodiment of the invention.

DETAILED DESCRIPTION OF THE INVENTION

Figure 1:
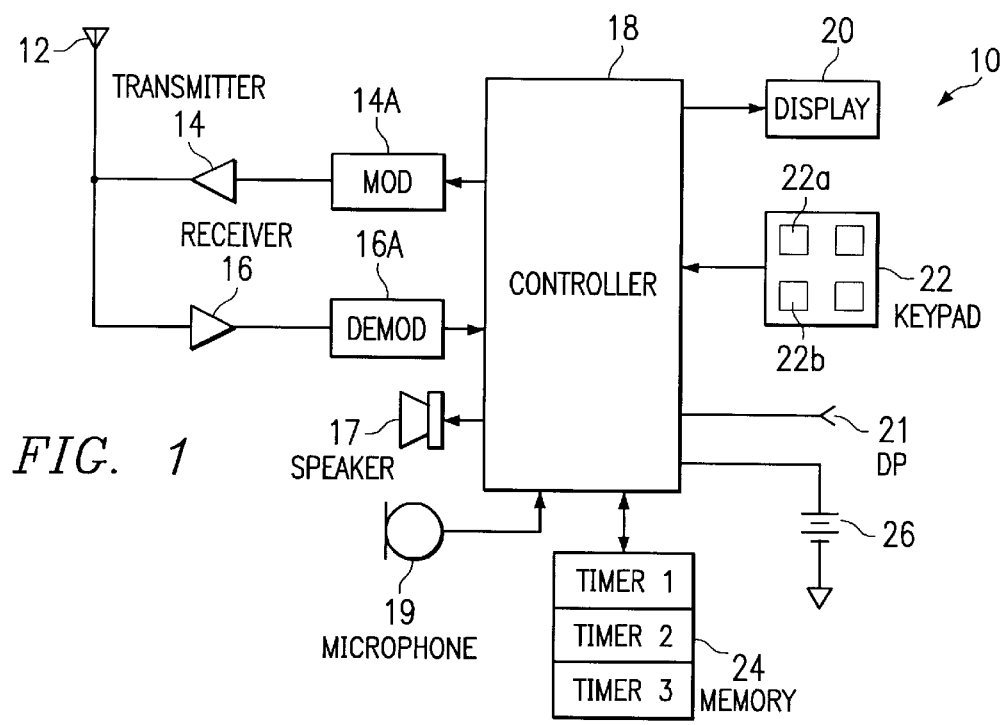
FIG. 1 is a block diagram illustrating a mobile telephone constructed and operated according to an embodiment of the invention.
Figure 2:
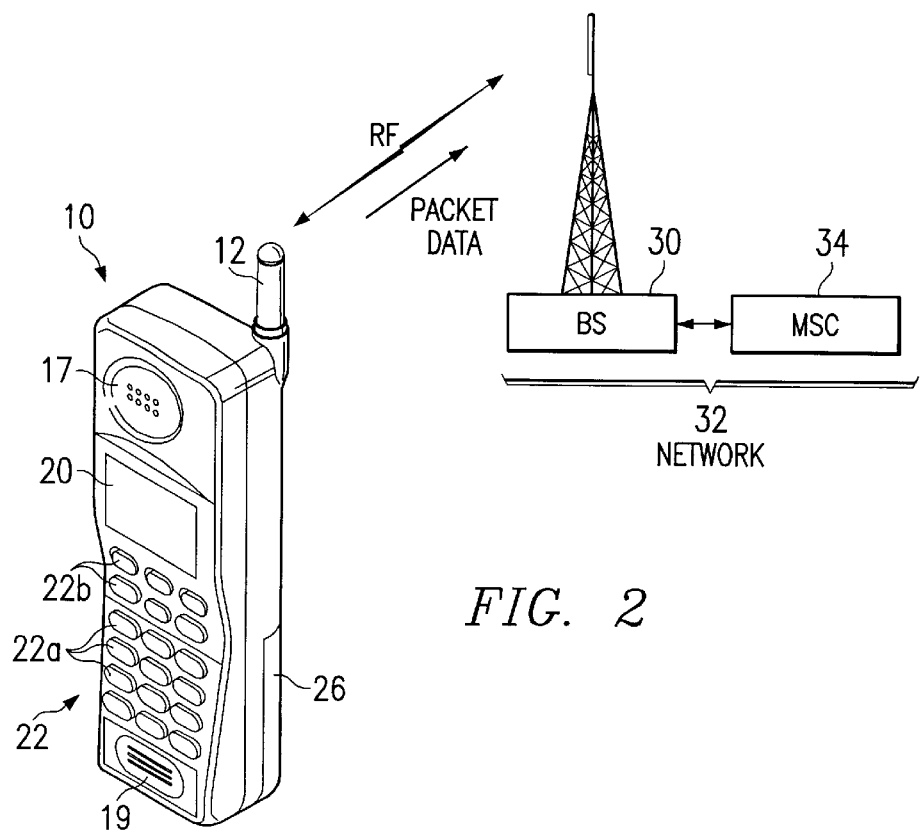
FIG. 2 is a diagram illustrating a mobile telephone in communication with a packet data network constructed and operated according to an embodiment of the invention.

The present invention has potential application to any telecommunications system that provides a connection based packet data service. The invention may be implemented into transceiving devices capable of sending and receiving packet data in a connection based packet call. Referring now to FIGS. 1 and 2, therein is illustrated a wireless user terminal or mobile station (MS) 10 and cellular network 32, that is suitable for practicing this invention. The mobile station 10 includes an antenna 12 for transmitting signals to and, for receiving signals from a base site or base station (BS) 30. The (BS) 30 is a part of cellular network 32 that includes a mobile switching center (MSC) 34. The MSC 34 provides a connection to landline trunks when the MS 10 is involved in a call.

The MS 10 includes a modulator (MOD) 14A, a transmitter 14, a receiver 16, a demodulator (DEMOD) 16A, and a controller 18 that provides signals to and receives signals from modulator 14A and demodulator 16A, respectively. These signals may include signaling information, and also speech, data and/or packet data transmitted between the MS 10 and BS 30 in accordance with the air interface standard of the applicable cellular system.

Controller 18 may be comprised of a digital signal processor device, a microprocessor device, and various analog to digital converters, digital to analog converters, and other support circuits. The control and signal processing functions of the mobile station are allocated between these devices according to their respective capabilities. MS 10 also includes a user interface comprised of a conventional earphone or speaker 17, a conventional microphone 19, a display 20, and a user input device, typically a keypad 22, all of which are coupled to the controller 18. The keypad 22 includes the conventional numeric (0–9) and related keys (#,*) 22a, and other keys 22b used for operating the mobile station 10. These other keys 22b may include, by example, a SEND key, various menu scrolling and soft keys, and a PWR key. The mobile station 10 may also include a battery 26 for powering the various circuits that are required to operate the mobile station. The mobile station 10 also includes various memories, shown collectively as the memory 24, wherein are stored a plurality of constants and variables that are used by the controller 18 during the operation of the mobile station. For example, the memory 24 may store the values of various cellular system parameters and the number assignment module (NAM). An operating program for controlling the operation of controller 18 is also stored in the memory 24 (typically in a ROM device). The memory 24 may also store packet data prior to transmission or after reception. The memory 24 also includes routines for implementing the method of call re-establishment according to the described embodiment of the invention.

Mobile station 10 may also function as a data terminal for transmitting or receiving packet data. As such, in this case MS 10 may be connected to a portable computer or a fax machine through a suitable data port (DP) 21.

The BS 30 also includes the necessary transmitters and receivers to allow signal exchange with MS 10. Controllers, processors and associated memories that may be located in BS 30 or MSC 34 provide control of the BS 30 and MSC 34, and implement routines for the method and apparatus of call re-establishment according to the described embodiment of the invention.

In the embodiment of this invention MS 10 and network 32 operate using a direct spread, code division multiple access (DS-CDMA) system, that is based on the IS-95A system standard. The network may operate in the 800 Mhz frequency range according to IS-95A standard, or, in the 1.8–2.0 Ghz range according to the IS-95 based ANSI-J-STD-008 standard. The network may provide a high speed packet data(HSPD) feature based on the IS-657 and TSB-74 standards, but which also uses techniques that have been proposed for HSPD IS-95A based systems. For example, more than one Walsh channel may be used as the forward traffic channel(base station to mobile station) to provide higher transmission rates, by simultaneously carrying separate packet data that belongs to the same user transmission. On the reverse traffic channel(mobile station to base station), multiplexed channels may be used to increase the data rate.

In this method serial data is input to a transmitter/modulator at a input data rate which is higher than the base data transmission rate. The serial data is received over a time period having a duration equal to the duration of the 20 millisecond IS-95 transmission frame and demultiplexed into a plurality of sets of input data. Each of the plurality of sets of input data is then processed in one of a plurality of subchannels using the system channel encoding and interleaving scheme to generate a plurality of sets of processed data. An output serial data stream is then generated by multiplexing the plurality of sets of processed data from the subchannels together. The serial output stream is generated so that the originally received serial data included in the serial output data stream, is generated at the input data rate. The serial output data stream is then spread to generate at least one spread data stream and transmitted on the channel during a second time period having a duration equal to the duration of the IS-95 transmission frame, so that the serial data included in the at least one spread data stream is transmitted at the input data rate. In the HSPD of the embodiment of the invention, packet data transmission rates of up to four times the 14.4 kbps maximum data rate provided by TSB-74 may be used. Table I illustrates the packet data service options (Rate Set Number and Multiplex options) and transmission rates available on the forward and reverse links with the HSPD of the embodiment of the invention.

TABLE I

| Rate Set Number and Multiplex Option | Maximum Transmission Rate |
| --- | --- |
| Rate Set 1 and Multiplex Option 1 | 9600 bps |
| Rate Set 2 and Multiplex Option 2 | 14400 bps |
| Rate Set 3 and Multiplex Option 1 | 38.4 bps |
| Rate Set 4 and Multiplex Option 2 | 57.6 bps |

A packet data service option is negotiated during call origination or at a later time during a call. Service option negotiation is performed according to the IS-95A and IS-657/TSB-74 standards, with the negotiable packet data service options including HSPD service options. Messages exchanged during call setup include high speed data (HSD) fields that contain HSPD service parameters. This allows the HSPD parameters in Table II to be established between the MS and BS.

TABLE II

| Parameter | Description |
| --- | --- |
| Rate Set & Multiplex Option | As described in Table I |
| Idle Rate | The date rate when no packet data is transmitted. |
| Intermediate Rate | The data rate after an idle rate transmission. |
| Peak Rate | The maximum data rate for the rate set. |
| Idle Time | The inactivity timer expiration value at which the transmission rate is limited to the intermediate rate. |
| Terminate Time | The inactivity timer value at which packet data service is terminated. |

Any of these parameters can be negotiated when packet data service is requested, or can be made a fixed value that is associated with the packet data service.

The Rate Set can be selected from the list of available rate sets defined in Table I. The Idle Rate may be, for example, the lowest rate in the Rate Set. The Intermediate Rate may be, for example, a basic rate of the Rate Set. The Peak Rate can be the highest rate in the Rate Set, or a lower rate if limited by the capabilities of the MS 10 or the available system capacity.

The Idle Time and Terminate Time may be determined by the network loading and the characteristics of the packet data service. On a heavily loaded network with limited available capacity, the network may set the Idle Time to have a small duration so that an inactive user's capacity can be quickly reallocated to an active user. The network reserves capacity to support the Intermediate Rate after the Idle Time expires. The Terminate Time is less critical because the actual capacity used is based on the Idle Rate transmission, and the Intermediate Rate capacity reserved by the network 32 is generally less than the Peak Rate. Inactivity timers in both MS 10 and base station 30 are used to track the times and generate appropriate signals. The timers in MS 10 or BS 30 are reset whenever packet data is sent or received by MS 10 or BS 30, respectively.

Figure 3:
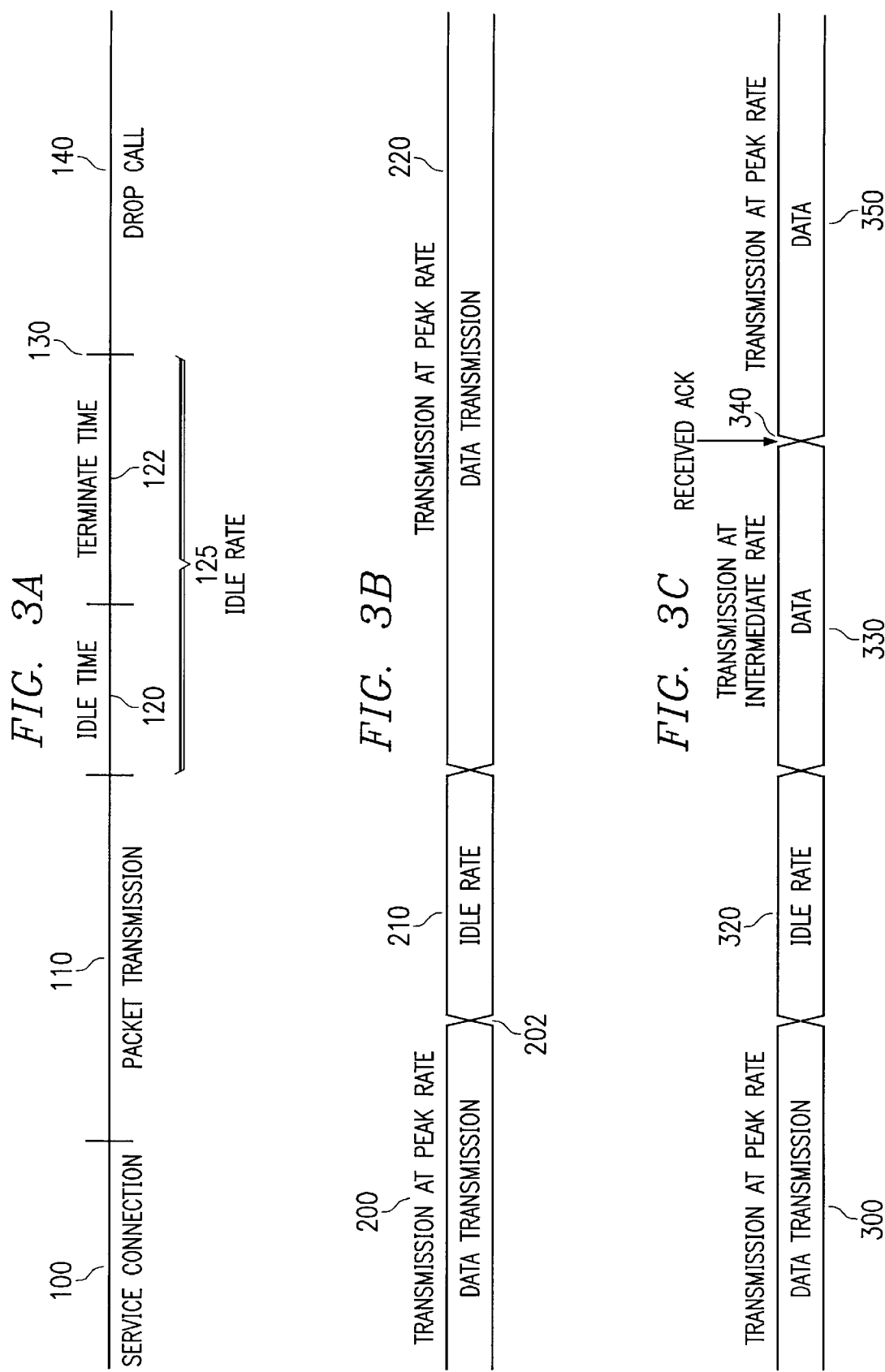
FIGS. 3A, 3B and 3C are diagrams illustrating a packet data inactivity timer function in a packet data network constructed and operated according to an embodiment of the invention.

Referring to FIG. 3A, 3B, and 3C, therein are diagrams illustrating packet data inactivity timer function in a packet data call. These diagrams illustrate the inactivity timer functions in both MS 10 and base station 30. After a packet data service is connected during time period 100, data packets are transmitted at the Peak Rate during time period 110. When no packets are transmitted the rate switches automatically to the Idle Rate during time period 125. Time period 125 includes idle time period 120 and terminate time period 122. The packet data service remains at idle rate until idle time period 120 expires. If packet transmission does not resume before the Terminate time period 122 expires at time 130, packet service is disconnected at time 130. During time period 140 the call has been released.

FIG. 3B shows re-initiation of packet data transmission before idle time expires. When packet transmission during Peak Rate time period 200 stops at time 202, and idle frames are transmitted during time period 210 at the Idle Rate for a period of time less than the Idle expiration time, the Peak Rate transmission may resume during time period 220, assuming that additional packet data becomes available for transmission.

FIG. 3C shows re-initiation of packet data transmission after the idle time expires and before the terminate time expires. If packet transmission during Peak Rate time period 300 stops for longer than the Idle expiration time 320, then the data transmission transitions to the Intermediate Rate during time period 330, until an acknowledgment (ACK) is received at time 340. This ACK message may be the current rate modify message that indicates a new data rate and required code channels. At this point the Peak Rate transmission may resume during time period 350. The receipt of the ACK 340 informs the transmitter that sufficient capacity exists to support re-initiation of the Peak Rate Transmission.

The inactivity timers in each of MS 10 and BS 30 may be implemented as two separate timers, each with an expiration time. By example, and referring to FIG. 1, the timers can be implemented as software timers (Timer 1 and Timer 2) that are maintained in a read/write portion of the memory 24. Alternatively, a single inactivity timer can be used, wherein the timer value is compared with the Idle Time value to detect the first expiration. Then the single timer continues to count and the timer value is compared with the Terminate Time value to detect the second expiration.

Figure 4:
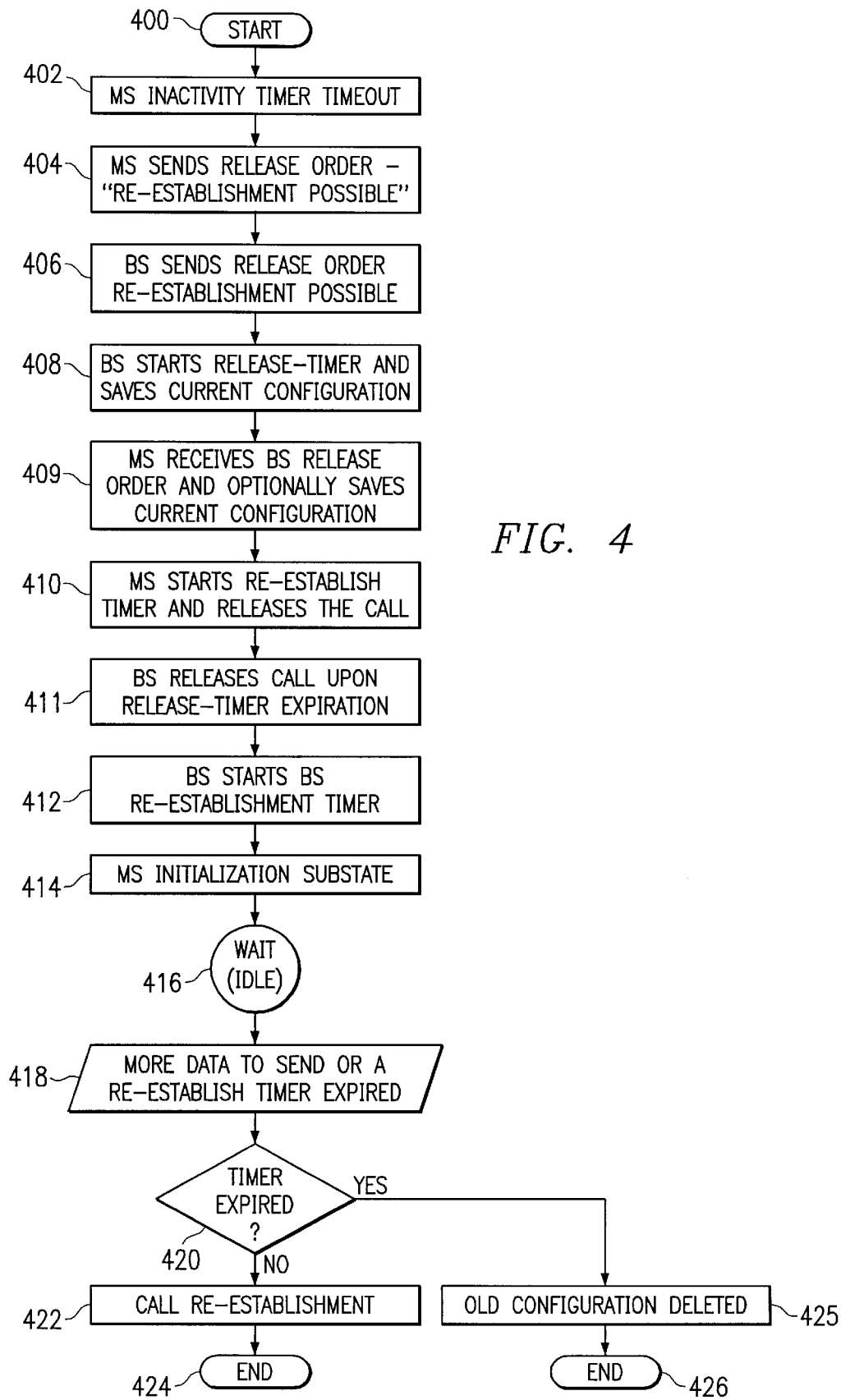
FIG. 4 is a flow diagram illustrating process steps performed, in a cellular system, according to an embodiment of the invention.

Referring now to FIG. 4, therein is a flow diagram illustrating process steps performed during the call release and re-establishment process in the cellular system of FIG. 1, according to the embodiment of the invention. FIG. 4 illustrates the case in which the inactivity timer expires in MS 10 after a packet data service option and traffic channels have been assigned for the call.

The process begins at step 402 when the inactivity timer expires in MS 10. Upon expiration of the inactivity timer, a release order message is formatted within MS 10. The release order message is a modified IS-95 release order that functions to indicate to network 32 that call re-establishment is possible with this call release. Referring now to FIGS. 9A and 9B, therein are illustrated release order message configurations that may be sent by a mobile station and base station, respectively, according to the embodiment of the invention. FIG. 9A shows the mobile station release order 906 that is sent on the reverse traffic channel. The release order 906 is modified from the IS-95 release order to allow MS 10 to order a call release, while indicating that call re-establishment is possible. MSG_TYPE field 902, ACK_SEQ filed 904, MSG_SEQ field 908 and ACK_REQ field 910 have functions similar to the corresponding fields of call re-establishment message 600 of FIG. 6. ENCRYPTION field 912 is set to the encyption mode last received in a channel assignment message, handoff direction message, or encryption mode order. The ORDER field 914 indicates that this is an order message. The ADD_RECORD_LENGTH field 916 indicates the length of additional records in the message and the RSVD field 920 is reserved for future standardization use. The ORDQ field 918 and RA_VALUE field 919 are specific to the call release message 906 used to indicate call re-establishment. Release with call re-establishment possible is indicated by the ORDQ field 918 being set to, by example, 00000011. The RA_VALUE field is a randomly generated 8 bit number that is used to identify the released call configuration in subsequent communications between the MS 10 and the MSC 34.

FIG. 9B shows the base station release order 912. Base station release order 912 is used for the identical purpose as mobile station release order 906, except it is transmit by the base station as a forward traffic channel order. MSG_TYPE field 922, ACK_SEQ field 924, MSG_SEQ field 926 and ACK_REQ field 928 have functions similar to the corresponding fields of call re-establishment message 600 of FIG. 6. ENCRYPTION field 930 is set to the encyption mode last sent to the mobile in a channel assignment message, handoff direction message, or encryption mode order. USE_TIME field 932 indicates whether or not an ACTION_TIME field 934 value is included in the message. If USE_TIME field indicates that an ACTION_TIME field 934 value is included, ACTION_TIME field 939 may be used to indicate a time, according to system time, when the order is to take effect. Otherwise ACTION_TIME field 939 can be set to 0. The ORDER field 936 indicates that this is an order message. The ADD_RECORD_LENGTH field 938 indicates the length of additional records in the message and the RSVD field 942 is reserved for future standardization use. As for mobile station release order message 906, base station release message 912 is identified by a ORDQ field 940 that is set to, by example, 00000011. Base station release message 912 also includes a RA_VALUE field 941 that is used to identify the released call configuration in subsequent communications between MS 10 and MSC 34.

Referring again to FIG. 4, next at step 404, release order message 906 is transmitted by MS 10 to BS 30 on the reverse traffic channel. Then, at step 406, the BS 30 returns a release order message 912 in response on the forward traffic channel. Next, at step 408, BS 30 starts a release timer and saves current service configuration information. The information saved includes information originally sent to MSC 34 in the IS-95 based call origination message. This may include the high speed data service configuration negotiated most recently, mobile station identification information (mobile station identifier (MSID), identifier type (MSID_TYPE), identifier length (MSID_LEN)) information, mobile station protocol revision (MOB_P_REV), extended station class mark (EXT_SCM), slotted mode indicator (SLOTTED_MODE), requested mode code (REQUEST_MODE) indicating CDMA, analog only etc., privacy mode indicator (PM), terminated call acceptance indication (MOB_TERM), called number information (DIGIT_MODE, NUMBER_TYPE, NUMBER_PLAN, MORE_FIELDS, NUM_FIELDS, CHARi).

Next, at step 409 the MS 10 receives the release order message 912 and, optionally, saves the current service configuration. If saved, the stored information can be used as an integrity check when the call is subsequently re-established. By example only, the MS 10 may save the current Rate Set and Multiplex Option data (Table 1), and compare the saved data to the Rate Set and Multiplex Option that is set for the re-established call. In practice, the MS 10 need save only the RA-VALUE information.

At step 410, MS 10 starts the MS re-establish timer and releases the call at the MS side. The re-establish timers may be implemented in either hardware or software or a combination of software and hardware. For example, a re-establish timer may be implemented in memory 24 of MS 10 as timer 3. The re-establish timer determines how long call configuration information is saved, without either the MS 10 or MSC 34 initiating re-establishment, after a call is released with a re-establishment possible indication in the call release message. A similar re-establish timer maybe implemented in MSC 34. Next, at step 411 the BS 30 releases the call upon the expiration of the release timer started at step 408. At step 412 BS 30 also starts the BS re-establish timer. Next, at step 414, the MS 10 enters the mobile station initialization substate. In the mobile station initialization substate, the MS 10 acquires the pilot channel of BS 30, tunes to the sync channel of BS 30, and then receives and processes system timing information received on the sync channel. Next, at step 416, the MS 10 moves to the idle state. In the idle state MS the 10 monitors an assigned paging channel of the BS 30. The MS 10 monitors the paging channel in Non-slotted mode. i.e., the MS 10 monitors all of the 80 ms paging slots on the paging channel. If an access parameter message is received while the MS 10 is in the idle state, overhead information is updated.

The MS 10 remains in the idle state of step 416 until the re-establish timer in either MS 10 or MSC 34 expires or, until either MS 10 or MSC 34 has more data to send that belongs to the released packet call. Either of these events are received as a process input at step 418, and causes the process to move to step 420. At step 420 it is determined if the re-establish timer in either the MS 10 or the MSC 34 has expired. If the re-establish timer has expired in either the MS 10 or the MSC 34, the process moves to step 425 where the old configuration is deleted from the memory of the device in which the timer expired. The process then moves to step 426 and ends. If, however, no re-establish timer has expired the process moves to step 422. At step 422 the call is then re-established according to the process shown in either FIG. 5A or 5B.

FIG. 4 illustrates the process when the inactivity timer expires first in the MS 10. If the inactivity timers expires first in BS 30, the process will be similar with the difference being that the MS 10 and BS 30 designations are interchanged in steps 402–412 of FIG. 4.

Figure 5A:
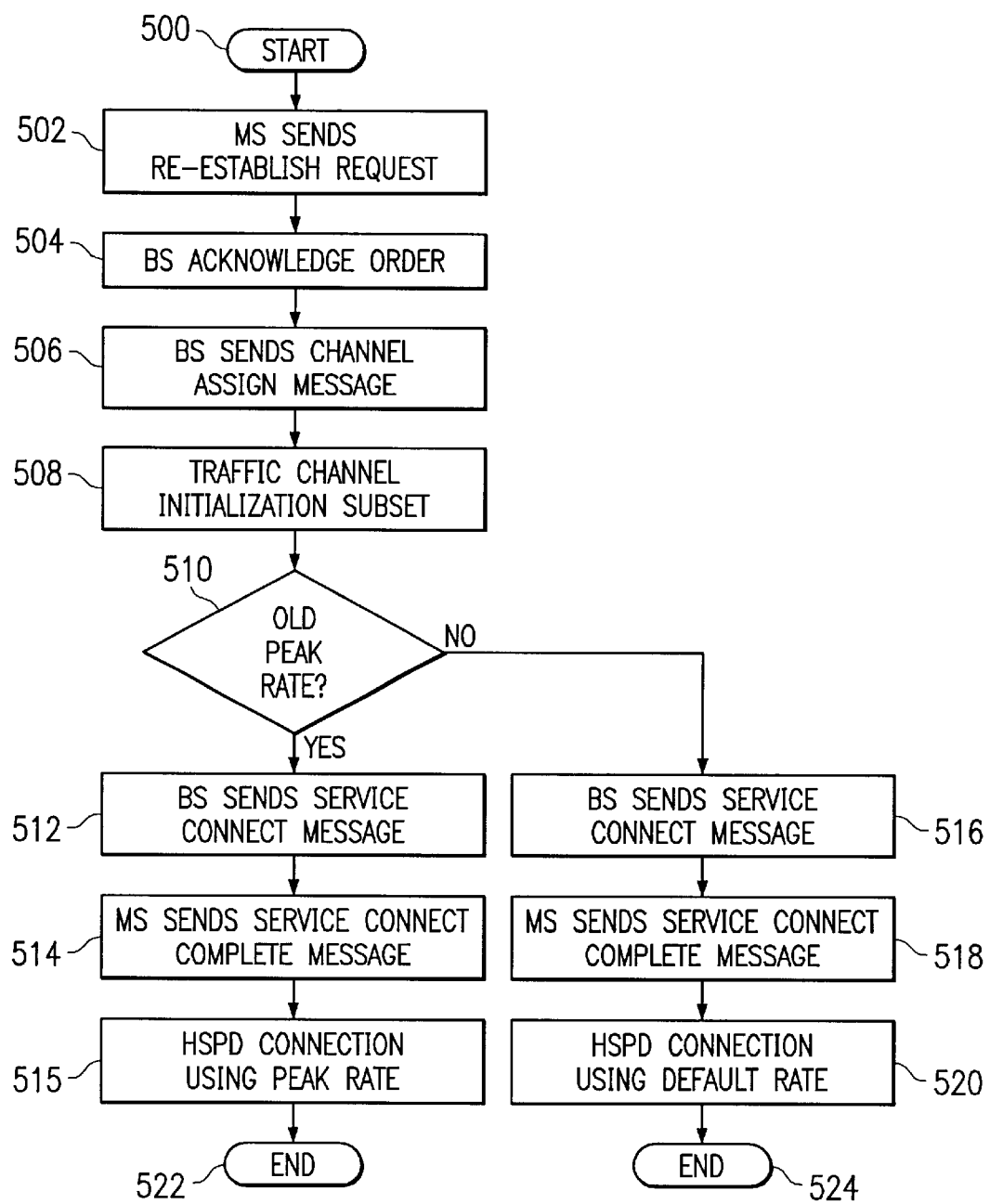

Referring now to FIGS. 5A and 5B, therein are flow diagrams illustrating process steps performed during call re-establishment initiated by a mobile station, and during call re-establishment initiated by a base station, respectively, according to the embodiment of the invention. When the MS 10 has data to send and initiates call re-establishment, the process is as shown in FIG. 5A. When the MSC 34 has data to send and initiates call re-establishment, the process is as shown in FIG. 5B. The difference between FIG. 5A and FIG. 5B is that, at step 502 in FIG. 5A the MS 10 sends the re-establishment message because the MS 10 has more packet data to send, while in FIG. 5B MS 10 sends the re-establishment message at step 530 in response to a paging message received from MSC 34 at step 528, with the paging message being sent from the BS 30 because the MSC 34 has more packet data to send. In each of the cases illustrated in FIGS. 5A and 5B, a similarly formatted call re-establishment message is used.

FIG. 6. illustrates the call re-establishment message, according to an embodiment of the invention. The message 600 includes the message type (MSG_TYPE) field 601, acknowledgment sequence number (ACK_SEQ) field 602, message sequence (MSG_SEQ) field 604, acknowledgment required (ACK_REQ) field 606, valid acknowledgment (VALID_ACK) field 608, acknowledgment type (ACK_TYPE) field 610, authenticate mode (AUTH_MODE) field 612, authentication data (AUTHR) field 614, re-establishment cause (REEST_CAUSE) field 616, random value (RA_VALUE) field 618, and a reserved (RSVD) field 620. The MSG_TYPE field 601 indicates that the message is a re-establishment request message. The ACK_SEQ field 602 is set to the value of any MSG_SEQ most recently received on a paging channel. If no such message was received on the paging channel, ACK_SEQ field 602 may be set to a default value, such as all bits set to 1. The MSG_SEQ field 604 is set to the sequence number for this message. The ACK_REQ field 606 indicates whether an acknowledgement is required for this message. For a call re-establishment message the ACK_REQ field 606 is set to indicate that acknowledgement is required. The VALID_ACK field 608 indicates whether the re-establishment request message is sent in response to a paging channel message sent by a base station to initiate call re-establishment. The ACK_TYPE field 610 is set to the value of the ADDR_TYPE field, if present, from the most recently received paging channel message requiring acknowledgement. If no such message was received the ACK_TYPE field 610 may be set to a default value such as all zeros. The AUTH_MODE field 612 indicates whether authentication is to be used. The AUTHR field 614 is set to a AUTHR value to be used in authentication, if AUTH_MODE field 612 is set to indicate that authentication is to be used. Authentication may or may not be used in call re-establishment. The REEST_CAUSE field 616 is unique to the re-establishment message and indicates whether the re-establishment is a mobile originated call re-establishment (i.e., connection having been established the first time using an origination message from the mobile station), or a mobile terminate call re-establishment (i.e, connection having been established the first time as a response to a page message from the base station). The RA_VALUE field 618 is unique to the re-establishment message and is set to the random value 919, 941 that was included in the release order that was either sent or received by MS 10, depending on whether MS 10 or MSC 34 initiated the call release. The RSVD field 620 is reserved for future use, if modifications are to be made to the re-establishment message. The re-establishment message does not include the call configuration information that was saved at step 406 of FIG. 4.

The process can be described with reference to FIG. 5A for call re-establishment initiated by the MS 10. The process begins at step 502 where MS 10 sends a re-establish request message to MSC 34 through BS 30. The re-establish request message sent at step 502 is as is shown in FIG. 6. The fields of re-establish request message 601 are set, as was described for FIG. 6, to indicate that the re-establish request message 601 is sent as a result of a mobile station originated re-establishment. The RA_VALUE is set to the RA_VALUE included in the release order message sent at step 404 of FIG. 4. In the preferred embodiment authentication is not performed. As an alternative, the AUTHR field 514 may also be calculated and set in MS 10 as is done for call origination. In this case, MSC 34 can then receive the AUTHR value 614 and RA_VALUE field 618 in the re-establishment message 600, retrieve, using the RA_VALUE, the values that were saved at step 408 and that are necessary to calculate its own AUTHR, and re-authenticate the MS 10 by comparing its own calculated AUTHR with the AUTHR field 514 received in the re-establishment message 600.

The re-establish request message 601 is transmitted as a modified IS-95 type access probe on an access channel of BS 30. Referring now to FIGS. 7A and 7B, therein are illustrated the re-establishment request access channel structure and an access probe sequence, respectively, of an embodiment of the invention. In FIG. 7A the system time is shown as a series of consecutive access channel frames 702 on the system time axis. The call re-establishment message 700 comprises a preamble and message(msg) capsule. The length of the preamble is 1+PAM_SZ access channel frames (one access channel frame=20 ms) and the message capsule length is one access channel frame. PAM_SZ is system defined value and is periodically sent by the network in the ACCESS parameters message on the access channel. Call re-establishment message 700 has a duration of three 20 millisecond access channel frames 702. PAM_SZ is equal to 1 for this case. The preamble lasts two access channel frames 702 and the msg capsule lasts one access channel frame 702. Because the call configuration is saved by MSC 34 for use in call re-establishment, the information necessary to transmit in the msg capsule of call re-establishment message 700 only requires one access channel frame 702 of 20 milliseconds. The (re-establishment request) access channel slot has a duration of 1+PAM_SZ+3 CAP_SZ access channel frames. The value of CAP_SZ is system defined and is also received periodically in the Access Parameters message in the Paging Channel. The access channel slots begin at access channel frames in which t mod (4+PAM_SZ+CAP_SZ)=0, where t is the System Time in frames. The re-establishment request access channel slot includes an access channel preamble and message capsule, and a "waiting period". The waiting period is used to allow the time remaining in the access channel slot to expire. The re-establishment request access channel slot has the same duration as the access channel slot.

Access probes are transmitted as shown in FIG. 7B. An access probe sequence comprises up to 1+NUM_STEP access probes, where NUM_STEP is a system defined parameter. Each access probe sequence begins with Access probe 1 and continues up until Access probe 1+NUM_STEP, if no acknowledgement is received from the system. Access probe 1 is transmitted at an initial power level (P1) and, each succeeding access probe is transmit at a power level incremented by P2. The re-establishment access attempt of the embodiment is modified from IS-95 access by removing the Ack Response Time-out(TA) at the end of each access probe. Access probes are only separated by the probe backoff (RT) system constant. Re-establishment request message are transmitted by the MS 10 until the maximum number of transmissions (MAX_REQ_SEQ) have been made, or until acknowledgement is received from the system.

FIG. 5A will be used to describe this process. The process steps 532–552 of FIG. 5B are identical to steps 506–524 of FIG. 5A. At step 504 a acknowledgement order is received by MS 10 from MSC 34 through BS 30. The acknowledgement order indicates to MS 10 that MSC 34 has received an access probe including the call re-establishment message. Next, at step 506, a channel assignment message is transmit from MSC 34 to MS 10 through BS 30. In the embodiment of the invention, the channel assignment message is a modified IS-95 channel assignment message. Referring now to FIGS. 8A, and 8B, therein are illustrated channel assignment messages according to an embodiment of the invention. Each message includes fields 806–814 which have functions similar to fields 601–608 of re-establish request message 600. Each message also includes an address type (ADDR_TYPE) field 816, address length (ADDR_LEN) field 818, address (ADDRESS) field 820, and additional record length (ADD_RECORD_LENGTH) field 824. The ADDR_TYPE field 818 indicates the type of address electronic serial number (ESN), international mobile station identity (IMSI), or temporary mobile station identity (TMSI) used in ADDRESS field 820 by the sending base station to address a receiving mobile station. The ADDR_LEN field 818 indicates the length of ADDRESS field 820. ADD_RECORD_LEN field 824 indicates the length of the additional fields following this one. Each channel assignment message used in call re-establishment is modified from the IS_95 channel assignment message to include a novel high speed data traffic assignment function for assign mode (ASSIGN_MODE) field 822. ASSIGN_MODE=110 can be used to establish both High Speed Data and High Speed packet Data connections. FIG. 8B shows the fields used when ASSIGN MODE=110. The channel assignment message is modified to include a HSPD initial rate set (INITIAL_RATE_SET) field 848 and an initial multiplex (INITIAL_MULTIPLEX) field 850. INITIAL_RATE_SET field 848 indicates the initial rate set number to be used immediately after the channel assignment message is received. The rate set number can be changed during the call setup procedure using the service negotiation procedure. The INITIAL_MULTIPLEX field 850 indicates the multiplex option to be used immediately after the channel assignment message is received. The multiplex option can also be changed during the call setup procedure. When ASSIGN_MODE=110, the Assignment message 800 also includes Frequency Included (FREQ_INCL) field 842, reserved (RSVD) field 844, granted mode (GRANTED_MODE) field 846, number of additional octets(i) field 852, number of code channels (NUM_CODE_CHAN) field 854, code channel I (CODE_CHANi) field 856, frame offset (FRAME_OFFSET) field 858, encryption mode (ENCRYPT_MODE) field 860, band class (BAND_CLASS) field 862 and CDMA frequency (CDMA_FREQ) field 864. FREQ_INCL field 842 indicates if the CDMA_FREQ field 864 is included in the channel assignment message. GRANTED_MODE field 846 is set to a first predetermined value, that indicates the MS 10 is to use a initial multiplex option and rate set number described in the INIT_MULTIPLEX field 850 and the INITIAL_RATE_SET field 848, respectively, and that service negotiation is not to take place before the base station sends the first service connect message. GRANTED_MODE field 846 may be set to a second predetermined value that indicates that MS 10 is to use an initial multiplex option and rate set number described in the INIT_MULTIPLEX field 850 and the INITIAL_RATE_SET field 848, respectively, and that service negotiation is to take place before the base station sends the first service connect message. NUM_ADD_OCTETS field 854 indicates the number of additional octets following this field. NUM_CODE_CHAN field 854 indicates the number of CODE_CHANi fields 856 that are in the message. The CODE_CHANi field may be used to assign parallel WALSH Channels for use on the forward or reverse links, depending on the method of high speed data transmission used. The FRAME_OFFSET field 858 indicates the frame delay relative to the system timing. ENCRYPT_MODE field 860 indicates whether encryption is to be used. The BAND_CLASS field 862 is set to indicate the IS-95(800 Mhz or 1.8 to 2.0 GHz) CDMA band class if FREQ_INCL field 842 is set to one. Otherwise BAND_CLASS field 862 is set to 0.

Returning to FIG. 5A, at step 508 the process moves to the traffic channel initialization substate. At step 508, the BS 30 begins sending filler frames using the new channel. MS 10 must receive a predetermined number of good filler frames within 0.2 sec. When MS 10 receives the required number of filler frames, MS 10 begins to send Traffic Channel preambles and BS 30 acknowledges the preambles using the BS ACK order message. Upon receipt of the BS ACK order message the MS 10 stops sending preambles and the system initialization is complete. Next, at step 510, a determination is made as to whether or not the previous (old) peak rate is to be used. If the MSC 34 determines that the system can support the previous peak rate, the process moves to step 512. At step 512 the MSC 34 sends a service connect message through BS 30 to MS 10. The service connect message includes a HSD service configuration indicating that the previous peak rate, is to be used. Next, at step 514, the MS 10 returns a service connect complete message to BS 30, the process moves to step 522, and the HSPD connection between MS 10 and BS 30 using the old peak rate is re-established. The call re-establishment process ends at step 522.

If, however, at step 510, it is determined by the MS 34 that the previous peak rate is not to be used, the process moves to step 516. At step 516 the MSC 34 sends a service connect message through BS 30 to MS 10. The service connect message includes a HSD service configuration indicating the default rate is to be used. Next, at step 514, the MS 10 returns a service connect complete message to BS 30, the process moves to step 524, and the HSPD connection between MS 10 and BS 30 using the default rate is established. The call re-establishment process ends at step 524.

While the invention has been particularly shown and described with respect to preferred embodiments thereof, it will be understood by those skilled in the art that changes in form and details may be made therein without departing from the scope and spirit of the invention.

What is claimed is:

1. A method for re-establishing a packet data call on a channel between a first transceiving device and a second transceiving device, comprising the steps of:

sending a first message from the second transceiving device to the first transceiving device, said first message indicating that a packet data call is to be released, the message including an identifier value;

saving at least the identifier value in the first transceiving device;

saving a set of call configuration data and the identifier value in the second transceiving device, the set of call configuration data usable to re-establish a channel between the first transceiving device and the second transceiving device;

releasing the packet data call from the channel at the first and second transceiving devices, thereby disabling the packet data call;

starting a re-establish timer, the re-establish timer being set to run for a predetermined time period;

detecting, at the second transceiving device, additional packet data for the packet data call within the predetermined time period during which the re-establish timer is set to run during said step of starting;

sending, in response to detection of the additional packet data during said step of detecting the additional packet data, a second message from the second transceiving device to the first transceiving device, the second message comprising a page message;

sending, in response to receiving a page message, a third message from said first transceiving device to said second transceiving device, said third message comprising a call re-establishment message indicating that the packet data call is to be re-established, and including at least the identifier value;

retrieving, in response to receiving said third message, the set of saved call configuration data in the second transceiving device based on the identifier value; and re-establishing the packet data call on the channel using the call configuration data retrieved in the step of retrieving to re-establish the packet data call.

2. The method of claim 1, wherein the first and the second transceiving devices comprise a mobile station and a base station, respectively, and wherein the set of call configuration data includes mobile station data and called number data.

3. The method of claim 2, further comprising, before the step of sending a first message, the step of randomly generating the identifier value, and wherein the step of sending the first message comprises sending a first message including the randomly generated identifier value.

4. The method of claim 2, wherein said predetermined time period comprises a first predetermined time period and wherein said method further comprises the step of starting an inactivity timer the inactivity timer being set to run a second predetermined time period, and wherein the method further comprises, before the step of sending a first message, the step of detecting an expiration of the inactivity timer, the expiration of the inactivity timer indicating that packet data has not been transmitted or received on the channel within said second predetermined time period, and wherein the step of sending a first message comprises sending a first message in response to detecting an expiration of the inactivity timer.

5. The method of claim 1, further comprising, before the step of sending a first message, the step of randomly generating an identifier value, and wherein the step of sending the first message comprises sending the first message including the randomly generated identifier value.

6. The method of claim 1, wherein said predetermined time period comprises a first predetermined time period and wherein said method further comprises an initial step of starting an inactivity timer, the inactivity timer being set to run a second predetermined time period, and wherein the method further comprises, before the step of sending the massage, the step of detecting an expiration of the inactivity timer, the expiration of the inactivity timer indicating that packet data has not been transmitted or received on the channel within the second predetermined time period, and wherein the step of sending a first message comprises sending the first message in response to detecting an expiration of the inactivity timer.

7. An apparatus for re-establishing a packet data call on a radio channel between a first transceiving device and a second transceiving device, said apparatus comprising:

means for sending a first message from the second transceiving device to the first transceiving device, said message indicating that a packet data call is to be released, said first message including an identifier value;

means for saving at least said identifier value in the first transceiving device;

means for saving a set of call configuration data and said identifier value in the second transceiving device, the set of call configuration data usable to re-establish a channel between the first transceiving device and the second transceiving device;

means for releasing the call from the channel at said first and said second transceiving devices, thereby disabling the packet data call;

means for starting a re-establish timer, said re-establish timer being set to run for a predetermined time period;

means for detecting, at the second transceiving device, additional packet data for the call within said predetermined time period and for generating a signal in response to detecting said additional packet data, during which the re-establish timer is set to run by said means for starting;

means for sending, in response to detection by said means for detecting of the additional packet data to said signal generated in said means for detecting, a second message from the second transceiving device to the first transceiving device, said second message comprising a page message;

means for sending, in response to receiving said page message, a third message from said first transceiving device to said second transceiving device, said third message comprising a call re-establishment message indicating that the packet data call is to be re-established, and including at least the identifier value; and means for retrieving, in response to receiving said third message, the saved set of call configuration data in the second transceiving device based on the identifier value.

8. The apparatus of claim 7, wherein said first and said second transceiving devices comprise a mobile station and a base station, respectively, and wherein said set of call configuration data includes mobile station data and called number data.

9. The apparatus of claim 7, further comprising, means for randomly generating said identifier value.

10. The apparatus of claim 7, wherein said predetermined time period comprises a first predetermined time period and wherein said method further comprises means for starting an inactivity timer, said inactivity timer being set to run a second predetermined time period, and wherein said apparatus further comprises means for detecting an expiration of said inactivity timer, the expiration of said inactivity timer indicating that packet data has not been transmitted or received on the channel within the second predetermined time period, and wherein said means for sending a message comprises means for sending said message in response to detecting an expiration of said inactivity timer.

11. The apparatus of claim 7, wherein said means for starting a timer comprises means for starting a timer in said second transceiving device, and said means for detecting additional packet data comprises means for detecting, within said predetermined first time period, additional packet data to be sent from said second transceiving device.

12. The apparatus of claim 11, wherein said first and said second transceiving devices comprise a mobile station and a base station, respectively, and wherein said set of call configuration data includes mobile station data and called number data.

13. The apparatus of claim 12, wherein said apparatus further comprises means for randomly generating said identifier value, and wherein said means for sending said first message comprises means for sending the first message to include said identifier value generated by said means for randomly generating.

14. The apparatus of claim 13, wherein said predetermined time period comprises a first predetermined time period and wherein said method further comprises means for starting an inactivity timer, said inactivity timer being set to run a second predetermined time period, and wherein aid apparatus further comprises means for detecting an expiration of said inactivity timer, the expiration of said inactivity timer indicating that packet data has not been transmitted or received on the channel within said second predetermined time period, and wherein said means for sending the first message comprises means for sending a first message in response to detecting an expiration of said inactivity timer.

15. A method for transmitting packet data between a mobile station and a base station in a digital telecommunications network, comprising the steps of:

establishing a packet data call on an assigned radio channel between the mobile station and base station;

transmitting packet data on the assigned radio channel;

transmitting a first message on the assigned radio channel for indicating that the packet data call is to be suspended, the first message including an identifier;

storing, at the mobile station, the identifier;

storing at the base station information required to re-establish the packet data call, the information required to re-establish the packet data call including the identifier and call configuration data related to the assigned radio channel;

suspending the packet data call and relinquishing the assigned radio channel;

within a predetermined time period, transmitting a second message from the base station to the mobile station to re-establish the packet data call, the second message comprising a page message;

sending, in response to receiving said page message, a third message from the mobile station to the base station, said third message comprising a call re-establishment message indication that the packet data call is to be re-established and the identifier; and re-establishing, in response to receiving said third message at base station, the packet data call on a same or different assigned radio channel based at least in part on the stored information that is retrieved using the received identifier.

* * * * *